Nov. 9, 1948.  T. P. PAJAK  2,453,338
APPARATUS FOR INSPECTING SHEET MATERIAL
Filed Nov. 9, 1945  2 Sheets-Sheet 1
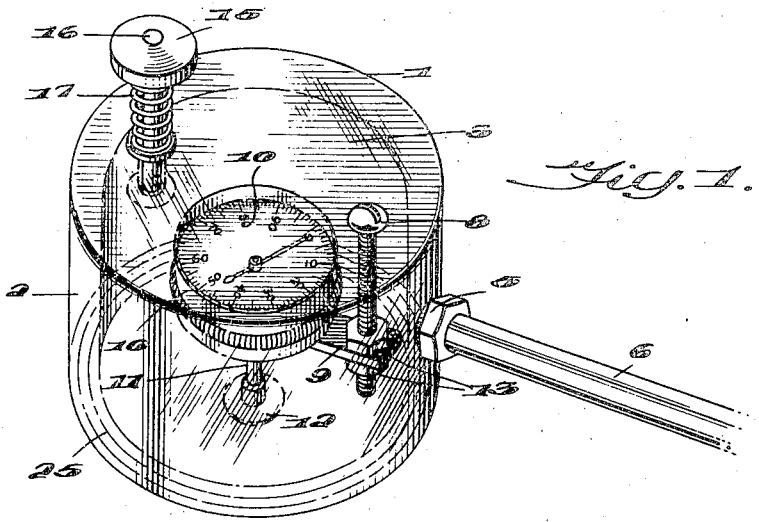
Fig. 1.
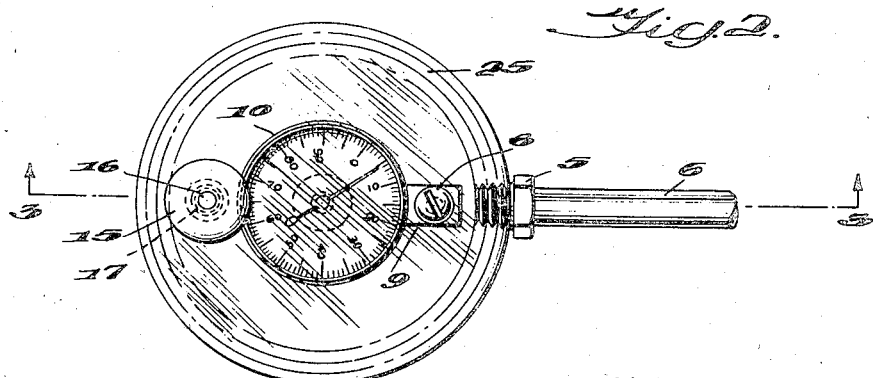
Fig. 2.
Fig. 4.
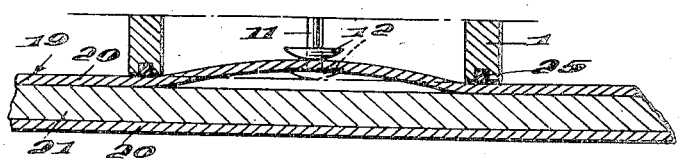
Inventor
Theodore P. Pajak,
By Donald W. Farrington
Attorney Nov. 9, 1948. T. P. PAJAK 2,453,338
APPARATUS FOR INSPECTING SHEET MATERIAL
Filed Nov. 9, 1945 2 Sheets-Sheet 2
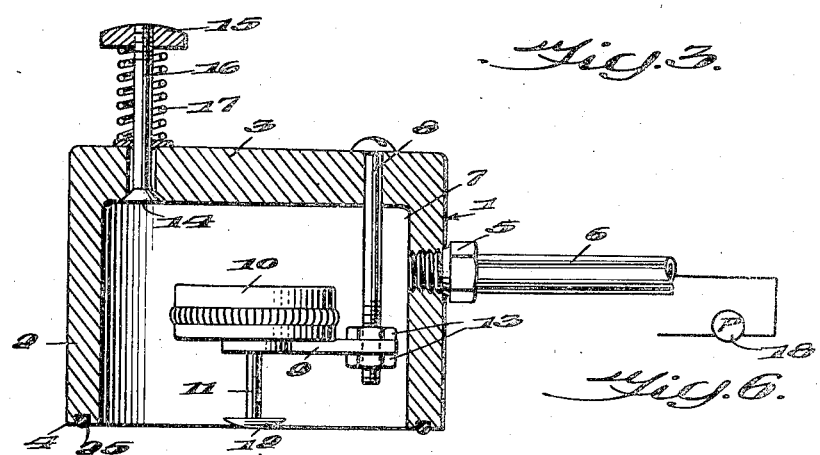
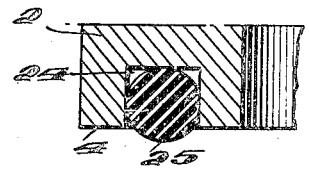
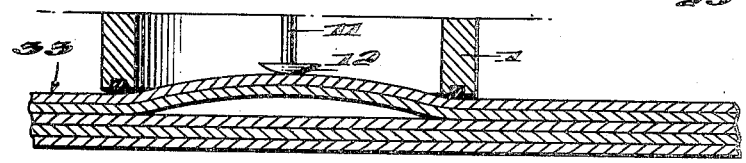
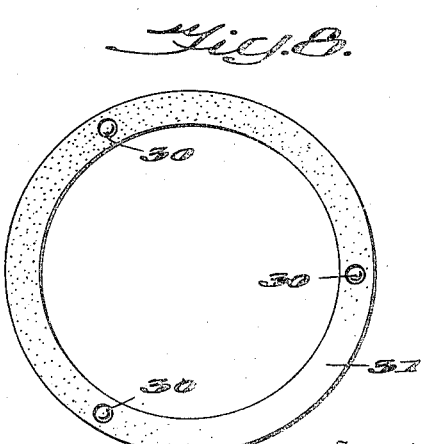
Inventor
Theodore P. Pajak,
By Donald W. Farrington
Attorney Patented Nov. 9, 1948

2,453,338

UNITED STATES PATENT OFFICE 2,453,338

APPARATUS FOR INSPECTING SHEET MATERIAL

Theodore P. Pajak, Baltimore, Md., assignor to The Glenn L. Martin Company, Middle River, Md., a corporation of Maryland Application November 9, 1945, Serial No. 627,564

3 Claims. (Cl. 73—37)

This invention relates to an instrument that measures the deflection of a predetermined area of a sheet of material when subjected to suction and can be used for measuring the thickness of sheet stock or for inspecting bonds between the laminar layers of laminated fabrics. The laminated fabrics with which this invention may be used are any materials which comprise a plurality of laminated layers bonded together in a unitary structure. The layers may be of wood, metal, plastic material or paper, glass, glass cloth or woven material impregnated with plastic. The plastics mentioned above are usually of the thermosetting plastics or thermo-plastic materials, which have sufficient structural strength to be used as laminar layers in laminated fabrics.

It has always been a problem in the plywood industry to determine the strength of materials in laminated structures due to the fact that for reasons of production, it cannot be presumed that all layers of the laminated material are uniformly coated with an adhesive and uniformly bonded. Much work has been done to insure the uniform coating of the surfaces of the laminated material and to insure the uniform application of heat and pressure in the curing operations, but it is still common practice to presume an 80% bond in laminated material when figuring its strength in a structure. Where weight or excess material is undesirable it is very important to determine more accurately the percent bond so that the maximum strength of the material may be used in the structure.

By this invention a method and means is provided which makes it possible to detect a deflection of sheet material when subjected to a differential in pressure and to inspect the efficiency of bonding without destroying the material bonded.

An object of this invention is to provide a method of checking the comparative rigidity of a sheet or of the bond of a laminar layer with an adjacent layer by detecting the amount of distortion of the layer in a predetermined area when subjected to a differential in pressure.

Another object of this invention is to provide a means for subjecting a predetermined area of a laminated material to a differential in pressure and detecting the amount of distortion of that area as an indication of the strength of its bond to the adjacent layer.

Further and other objects will become apparent from the description of the accompanying drawings which form a part of this disclosure and in which like numerals refer to like parts.

In the drawings:

Figure 1 is a perspective view of the instrument.

Figure 2 shows a top plan view of the instrument.

Figure 3 is a sectional view taken on the line 3—3 of Figure 2.

Figure 4 is a fragmentary sectional view showing the operation of the instrument on a laminated material.

Figure 5 is a view similar to Figure 4 showing the operation of the instrument on the outer layers of a laminated material.

Figure 6 is a fragmentary view showing the seal.

Figures 7 and 8 show a modified form of the instrument.

As pointed out above laminated materials, of which plywood is a typical example, consist of layers or sheets of material which are coated with an adhesive or bonding material and stacked and pressed together until the bond is set. In the case of the thermosetting adhesives, heat and pressure are applied to effect the bond. If the application of the adhesive is not uniform so that a poor bond takes place in an area or if either heat or pressure in the curing operation are insufficient, an area in the plywood will be considerably less strong than the surrounding area due to an inadequate bond. In a large sheet of structural material, this may be a relatively small area but it is impossible to detect by any ordinary inspection facilities and may seriously impair the strength of any structure which depends upon the maximum strength of this sheet of material.

The instrument illustrated in the drawings is designed to carry out applicant's method of inspecting bonded laminar layers to determine the efficiency of the bond. If a predetermined area of the laminated material is subjected to a reduced pressure or suction, that layer will be lifted away from the adjacent layer depending upon the material itself, if the bond to that adjacent layer is inadequate. The rigidity of a surface sheet is greatly enhanced by being bonded to an under sheet. Therefore, the amount of distortion of a surface sheet whether it is metal, wood, plastic or any similar material can be quite readily measured.

The instrument shown in the drawings consists of an inverted cup-shaped member 1 which consists of a side wall 2 of any cross-sectional shape, having a top wall 3 of transparent material. For ease of adjustment of this instrument, it is desirable to make the whole member 1 of a transparent plastic material. Rim or edge 4 is formed in a plane so that a fair seal is provided when edge 4 engages a flat surface. Edge 4 may be provided with a seal as shown in Figure 6 to render the instrument more stable when used on a rough surface. This edge seal is optional as good results can be obtained on most surfaces without it. A fitting 5 affords communication between a flexible exhaust tube 6 and the interior 7 of cup-shaped member 1. Bolt 8 is secured in plastic top 3 to afford a support from the top for bracket 9 on which in turn is mounted a dial indicator 10 having a stem 11 with a spherically shaped foot 12. This dial indicator is of a conventional type which measures thousandths of an inch as foot 12 is moved upwardly. Nuts 13 afford an adjustment for bracket 9 on bolt 8. Valve 14 can be opened by button 15 mounted on valve stem 16. Spring 17 holds valve 14 in the normally closed position.

Bracket 9 is so adjusted on screw 8 that when the instrument is laid on a plane surface, foot 12 is moved upwardly so that the instrument reads approximately zero. It is not necessary to adjust the pointer to zero on the dial.

Exhaust tube 6 is connected to an exhaust pump 18 and the interior of the instrument can be exhausted or the pressure reduced to a predetermined amount.

When the instrument is used for the inspection of sandwich materials or laminated material, to determine faulty bonds or the lack of bond between the face and the under layers, the instrument is placed on the area to be inspected. The vacuum control valve 14 is opened by button 15 so that the interior of the instrument is at atmospheric pressure. A reading is then taken on the dial of the gage under this condition. The valve is then closed and if there is a faulty bond or no bond between the surface sheet and the adjacent layer, several thousandths of an inch deflection in the surface sheet of the area spanned by the instrument will be detected. This condition is illustrated in Figures 4 and 5. The instrument casing 1 is placed upon material 19 which consists of layers 20 and intermediate layer 21. If there is a faulty bond between layers 20 and 21, foot 12 will be moved as layer 20 raises as shown, when the interior of chamber 1 is evacuated. This is typical of all laminated or sandwich materials. The layers 20 may be of plywood of conventional form or layers 20 may be surface sheets of wood, paper or metal and layer 21 may be a core material of any lightweight material such as balsa wood, honeycomb construction or prepared cores of wood pulp and the like which are all low density lightweight core materials.

Figure 5 illustrates a five ply laminated material 33 in which the faulty bond is shown to appear between the second and third layers. In this case the displacement of foot 12 and the indication on the dial will not be as much as in the single surface sheet, but a deflection of several thousandths of an inch can be detected under this condition. The instrument may be calibrated for the materials employed in the sandwich construction and for a number and thickness of layer so that for a particular material a deflection of so many thousandths of an inch can be readily interpreted as a faulty bond in a particular layer.

The detail of the seal in edge 4 is shown in Figure 6 and consists of a groove 24 which may be of general rectangular form. Member 25 is a resilient gasket material of generally circular cross-section which extends sufficiently below edge 4 so that a good seal is formed between an irregular surface and edge 4. For surfaces of double curvature, the bottom rim of member 1 may be modified as shown in Figure 7. Three pins 30 are equally spaced around surface 4 and extend beyond the surface depending upon the degree of curvature of the double curved surface. A gasket 31 forms an extension of wall 2 and surrounds pins 30. It can readily be seen that when the instrument is held against a double curved surface, the three pins determine the plane and the rubber gasket seals the space between the pins around the wall. By operating the vacuum control valve, two readings can be taken as described above to detect any deflection of the area spanned by the instrument that would result from an inadequate bond.

It is to be understood that the amount of suction or vacuum varies with the thickness of the surface sheet. By reason of spring 17 holding valve 14 closed, this valve may also be used to regulate the amount of suction in the chamber. It may be adjusted to control the pressure differential inside and outside the chamber. By way of example, an absolute pressure of five pounds per square inch (10" of mercury) has been found satisfactory in testing the bonds of sandwich materials having aluminum surface sheets of from .008" to .016".

Due to the ability of this instrument to detect deflection in sheet material, it can also be calibrated to inspect the thickness of a single sheet material, especially large sheets where it is impractical to use micrometers at the central area. This instrument has been used satisfactorily in detecting .0005" variation in .016" thickness Alclad aluminum sheet materials.

It is to be understood that certain changes, alterations, modifications and substitutions can be made without departing from the spirit and scope of the appended claims.

I claim is my invention:

1. An inspection instrument for laminated materials comprising a cup-like member to be placed with its open side against a sheet of laminar material, said cup-like member having a transparent wall opposite said open side, a dial indicator mounted on said member so that the dial may be viewed through said transparent wall, the measuring foot of said indicator being located in the plane of the open side of said cup-shaped member, a vacuum line in communication with said member to continuously exhaust the interior of said member and a vacuum control valve mounted in the wall of said member to control the pressure within said member.

2. An instrument for detecting deflection indicating a faulty bond in the surface sheet of laminated sheet material, comprising a cup-like member forming a chamber having an open side terminating in a plane to be placed against said laminated sheet, said member having a transparent wall opposite said open side, a deflection indicator mounted in said chamber so that the indicator may be viewed through said transparent wall, a deflection measuring foot on said indicator located substantially in the plane of the open side of said chamber, a vacuum line secured to the wall of said member to continuously exhaust said chamber, a vacuum control valve mounted on the wall of said chamber to regulate the flow of air into the chamber to maintain the chamber at a predetermined pressure.

3. An instrument for detecting deflection indicating rigidity of sheet material, comprising a hollow member having one end open, the edges of which form a plane to be placed against said sheet, said member having a side opposite the open end of transparent material, a deflection indicating device mounted on a bracket secured to the wall of said hollow member so locating said indicating device as to be viewed through said transparent side, means to continuously evacuate said hollow member and valve means mounted on the wall of said hollow member to meter the flow of air from the atmosphere to the inside of said hollow member to maintain a predetermined pressure within said hollow chamber.

THEODORE P. PAJAK.

REFERENCES CITED

The following references are of record in the file of this patent:

UNITED STATES PATENTS

| Number | Name | Date |
|---|---|---|
| 1,723,636 | Tuckerman et al. | Aug. 6, 1929 |
| 1,825,699 | Landrum | Oct. 6, 1931 |
| 2,150,836 | Lamb | Mar. 14, 1939 |

FOREIGN PATENTS

| Number | Country | Date |
|---|---|---|
| 445,761 | Great Britain | Apr. 17, 1936 |